US012591774B2

(12) United States Patent (10) Patent No.: US 12,591,774 B2
Lalwani et al. (45) Date of Patent: Mar. 31, 2026

(54) ORDERING INFRASTRUCTURE USING APPLICATION TERMS

(71) Applicant: Dell Products L.P., Round Rock, TX (US)

(72) Inventors: Rachna Lalwani, Westford, MA (US); Owen Martin, Hopedale, MA (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 928 days.

(21) Appl. No.: 17/812,272

(22) Filed: Jul. 13, 2022

(65) Prior Publication Data

US 2024/0020523 A1      Jan. 18, 2024

(51) Int. Cl.
*G06N 3/08* (2023.01)
(52) U.S. Cl.
CPC ...................................... *G06N 3/08* (2013.01)
(58) Field of Classification Search
CPC .............................. G06Q 10/0875; G06N 3/08
See application file for complete search history.

(56) References Cited

U.S. PATENT DOCUMENTS

| | | | | |
|---|---|---|---|---|
| 5,946,210 A * | 8/1999 | Montminy | .............. | G06F 30/00 |
| | | | | 700/32 |
| 10,248,400 B1 * | 4/2019 | Coleman | ................... | G06F 8/60 |
| 11,205,142 B2 * | 12/2021 | Opfar | .............. | G06Q 10/06316 |
| 11,416,816 B1 * | 8/2022 | Collier | ............. | G06Q 10/06316 |
| 2005/0278271 A1 * | 12/2005 | Anthony | ................. | G06F 30/00 |
| | | | | 706/919 |
| 2006/0287932 A1 * | 12/2006 | Wulteputte | ............ | G06Q 10/06 |
| | | | | 705/26.4 |
| 2011/0098835 A1 * | 4/2011 | Yucel | ...................... | G06F 30/15 |
| | | | | 707/769 |
| 2020/0193491 A1 * | 6/2020 | Hu | ................... | G06V 30/19147 |
| 2021/0224878 A1 * | 7/2021 | Wright | .............. | G06Q 30/0627 |
| 2021/0304134 A1 * | 9/2021 | Noyes | .................. | G06F 18/214 |
| 2022/0156421 A1 * | 5/2022 | Dejanovic | ............ | B29C 64/393 |
| 2022/0398365 A1 * | 12/2022 | Kumar | .................. | B29C 64/386 |

OTHER PUBLICATIONS

Baboolal, Kevin, and Patrick Hosein. "Material and Cost estimation of a Customized Product based on the Customer's description." 2021 Second International Conference on Intelligent Data Science Technologies and Applications (IDSTA). IEEE, 2021. (Year: 2021).*

* cited by examiner

*Primary Examiner* — Nathan A Mitchell
(74) *Attorney, Agent, or Firm* — Amin, Turocy & Watson, LLP

(57) ABSTRACT

A system can train a generator neural network to produce a trained generator neural network of a generative adversarial network, wherein the trained generator neural network is configured to output a bill of materials in response to receiving functional requirements for a computer system. The system can train a discriminator neural network to produce a trained discriminator neural network of the generative adversarial network, wherein the trained discriminator neural network is configured to output whether the bill of materials received from the trained generator neural network satisfies the functional requirements for the computer system. The system can produce an output bill of materials from the generative adversarial network based on the functional requirements. The system can store the output bill of materials in the system.

20 Claims, 11 Drawing Sheets

SERVER 102
ORDERING
INFRASTRUCTURE USING
APPLICATION TERMS
COMPONET 108
COMMUNICATIONS
NETWORK
104
CLIENT COMPUTER 106
CLIENT COMPUTER 106
FIG. 1

200
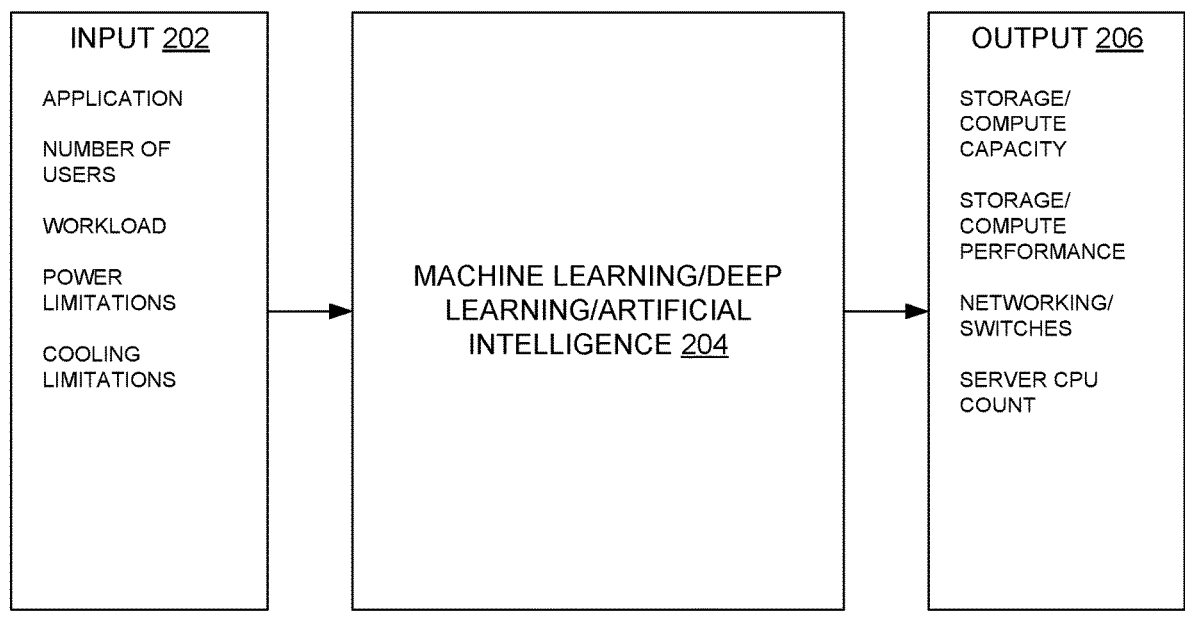
| INPUT 202 | MACHINE LEARNING/DEEP LEARNING/ARTIFICIAL INTELLIGENCE 204 | OUTPUT 206 |
|---|---|---|
| APPLICATION<br><br>NUMBER OF USERS<br><br>WORKLOAD<br><br>POWER LIMITATIONS<br><br>COOLING LIMITATIONS | | STORAGE/ COMPUTE CAPACITY<br><br>STORAGE/ COMPUTE PERFORMANCE<br><br>NETWORKING/ SWITCHES<br><br>SERVER CPU COUNT |
FIG. 2

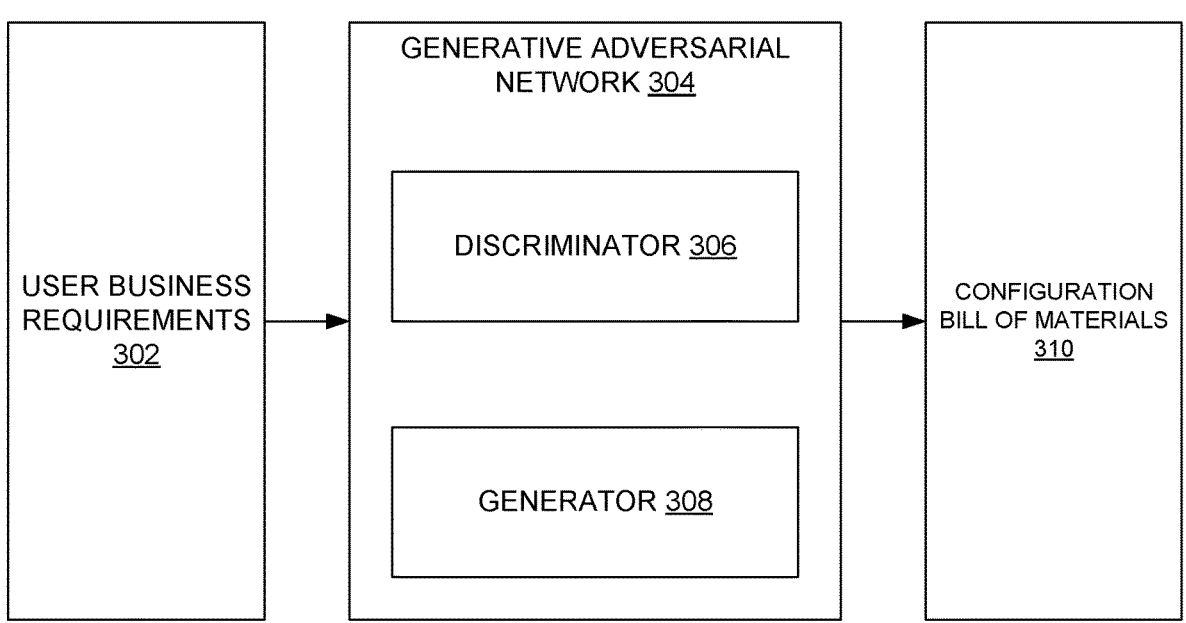
FIG. 3

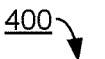
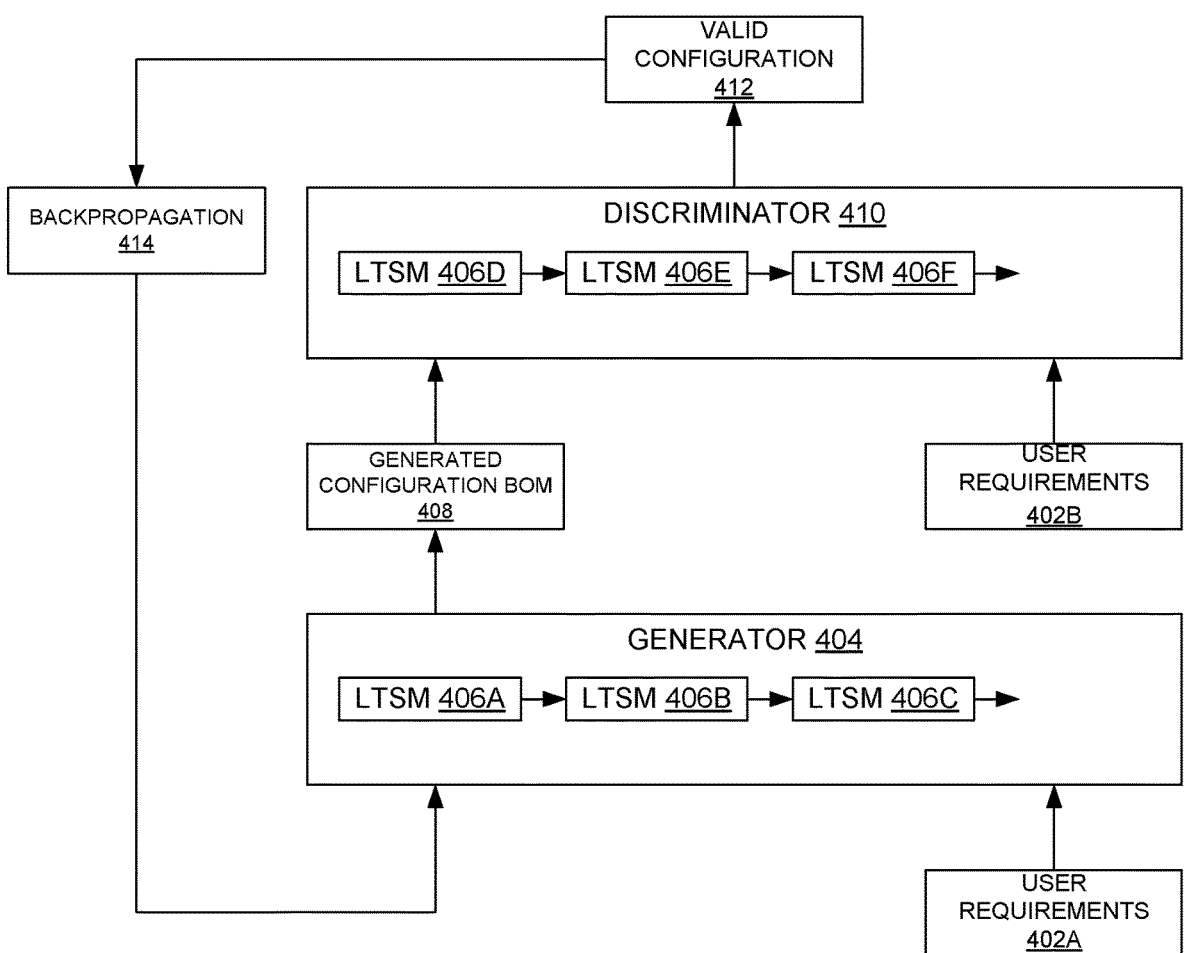
FIG. 4

500

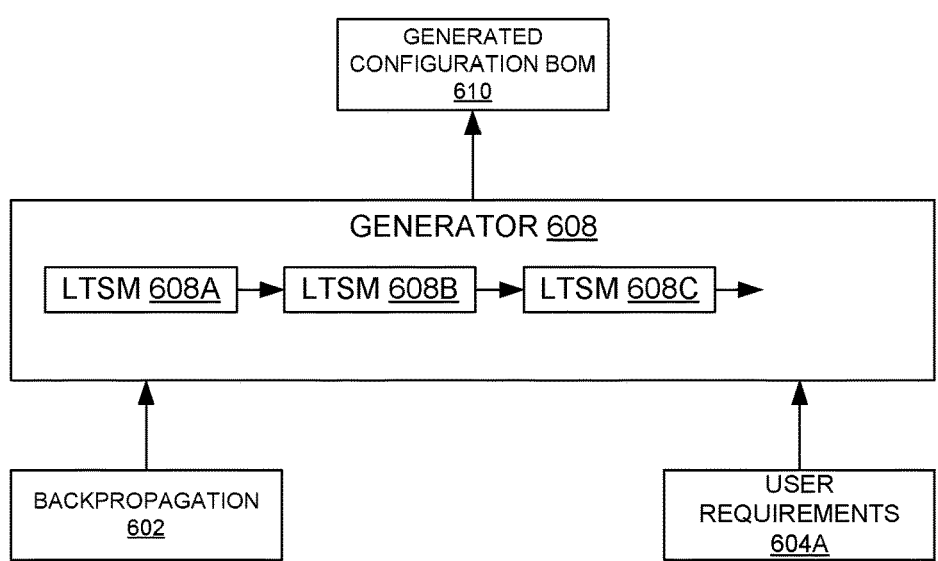
FIG. 6

700
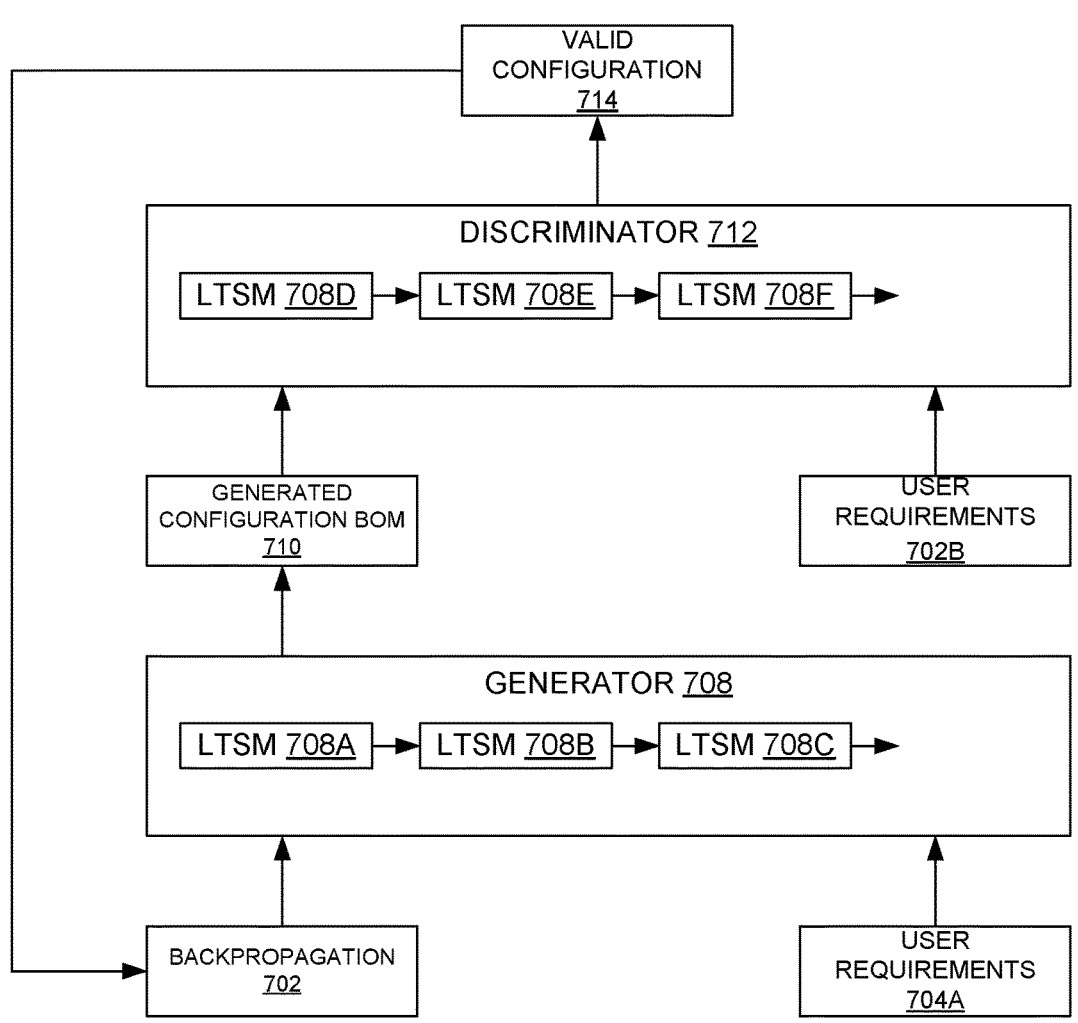
FIG. 7

800

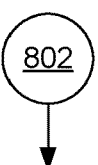

802

TRAINING A GENERATOR NEURAL NETWORK TO PRODUCE A TRAINED GENERATOR NEURAL NETWORK OF A GENERATIVE ADVERSARIAL NETWORK, WHEREIN THE TRAINED GENERATOR NEURAL NETWORK IS CONFIGURED TO OUTPUT A BILL OF MATERIALS IN RESPONSE TO RECEIVING FUNCTIONAL REQUIREMENTS FOR A COMPUTER SYSTEM 804

TRAINING A DISCRIMINATOR NEURAL NETWORK TO PRODUCE A TRAINED DISCRIMINATOR NEURAL NETWORK OF THE GENERATIVE ADVERSARIAL NETWORK, WHEREIN THE TRAINED DISCRIMINATOR NEURAL NETWORK IS CONFIGURED TO OUTPUT WHETHER THE BILL OF MATERIALS RECEIVED FROM THE TRAINED GENERATOR NEURAL NETWORK SATISFIES THE FUNCTIONAL REQUIREMENTS FOR THE COMPUTER SYSTEM 806

PRODUCING AN OUTPUT BILL OF MATERIALS FROM THE GENERATIVE ADVERSARIAL NETWORK BASED ON THE FUNCTIONAL REQUIREMENTS 808

STORING THE OUTPUT BILL OF MATERIALS IN THE SYSTEM 810

900

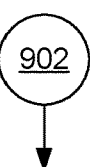

902

TRAINING A GENERATOR NEURAL NETWORK TO PRODUCE A TRAINED GENERATOR NEURAL NETWORK, WHEREIN THE TRAINED GENERATOR NEURAL NETWORK IS CONFIGURED TO OUTPUT A BILL OF MATERIALS IN RESPONSE TO RECEIVING FUNCTIONAL REQUIREMENTS FOR A COMPUTER SYSTEM 904

TRAINING A DISCRIMINATOR NEURAL NETWORK TO PRODUCE A TRAINED DISCRIMINATOR NEURAL NETWORK, WHEREIN THE TRAINED DISCRIMINATOR NEURAL NETWORK IS CONFIGURED TO OUTPUT WHETHER THE BILL OF MATERIALS RECEIVED FROM THE TRAINED GENERATOR NEURAL NETWORK SATISFIES THE FUNCTIONAL REQUIREMENTS FOR THE COMPUTER SYSTEM 906

PRODUCING A RESULTING BILL OF MATERIALS FROM THE TRAINED GENERATOR NEURAL NETWORK AND THE TRAINED DISCRIMINATOR NEURAL NETWORK BASED ON A FIRST IDENTIFIER OF FUNCTIONAL REQUIREMENTS 908

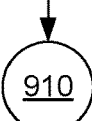

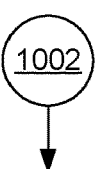

1002

TRAINING A FIRST NEURAL NETWORK TO PRODUCE A TRAINED FIRST NEURAL NETWORK, WHEREIN THE TRAINED FIRST NEURAL NETWORK IS CONFIGURED TO OUTPUT A BILL OF MATERIALS IN RESPONSE TO RECEIVING FUNCTIONAL REQUIREMENTS FOR A COMPUTER SYSTEM 1004

TRAINING A SECOND NEURAL NETWORK TO PRODUCE A TRAINED SECOND NEURAL NETWORK, WHEREIN THE TRAINED SECOND NEURAL NETWORK IS CONFIGURED TO OUTPUT WHETHER THE BILL OF MATERIALS RECEIVED FROM THE TRAINED FIRST NEURAL NETWORK SATISFIES THE FUNCTIONAL REQUIREMENTS FOR THE COMPUTER SYSTEM 1006

STORING A GENERATED BILL OF MATERIALS, WHICH WAS GENERATED FROM THE TRAINED FIRST NEURAL NETWORK AND THE TRAINED SECOND NEURAL NETWORK BASED ON THE FUNCTIONAL REQUIREMENTS 1008

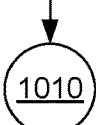

ORDERING INFRASTRUCTURE USING APPLICATION TERMS

BACKGROUND

Computer infrastructure can comprise computer hardware and/or computer programs.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can train a generator neural network to produce a trained generator neural network of a generative adversarial network, wherein the trained generator neural network is configured to output a bill of materials in response to receiving functional requirements for a computer system. The system can train a discriminator neural network to produce a trained discriminator neural network of the generative adversarial network, wherein the trained discriminator neural network is configured to output whether the bill of materials received from the trained generator neural network satisfies the functional requirements for the computer system. The system can produce an output bill of materials from the generative adversarial network based on the functional requirements. The system can store the output bill of materials in the system.

An example method can comprise training, by a system comprising a processor, a generator neural network to produce a trained generator neural network, wherein the trained generator neural network is configured to output a bill of materials in response to receiving functional requirements for a computer system. The method can further comprise training, by the system, a discriminator neural network to produce a trained discriminator neural network, wherein the trained discriminator neural network is configured to output whether the bill of materials received from the trained generator neural network satisfies the functional requirements for the computer system. The system can further comprise producing a resulting bill of materials from the trained generator neural network and the trained discriminator neural network based on a first identifier of functional requirements.

An example non-transitory computer-readable medium can comprise instructions that, in response to execution, cause a system comprising a processor to perform operations. These operations can comprise training a first neural network to produce a trained first neural network, wherein the trained first neural network is configured to output a bill of materials in response to receiving functional requirements for a computer system. These operations can further comprise training a second neural network to produce a trained second neural network, wherein the trained second neural network is configured to output whether the bill of materials received from the trained first neural network satisfies the functional requirements for the computer system. These operations can further comprise storing a generated bill of materials, which was generated from the trained first neural network and the trained second neural network based on the functional requirements.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate ordering infrastructure using application terms, in accordance with an embodiment of this disclosure;

FIG. 2 illustrates another example system architecture that can facilitate ordering infrastructure using application terms, in accordance with an embodiment of this disclosure;

FIG. 3 illustrates another example system architecture that can facilitate ordering infrastructure using application terms, in accordance with an embodiment of this disclosure;

FIG. 4 illustrates another example system architecture that can facilitate ordering infrastructure using application terms, in accordance with an embodiment of this disclosure;

FIG. 6 illustrates another example system architecture that can facilitate ordering infrastructure using application terms, in accordance with an embodiment of this disclosure;

FIG. 7 illustrates another example system architecture that can facilitate ordering infrastructure using application terms, in accordance with an embodiment of this disclosure;

FIG. 8 illustrates an example process flow that can facilitate ordering infrastructure using application terms, in accordance with an embodiment of this disclosure;

FIG. 9 illustrates another example process flow that can facilitate ordering infrastructure using application terms, in accordance with an embodiment of this disclosure;

FIG. 10 illustrates another example process flow that can facilitate ordering infrastructure using application terms, in accordance with an embodiment of this disclosure;

DETAILED DESCRIPTION

Overview

Figure 5:
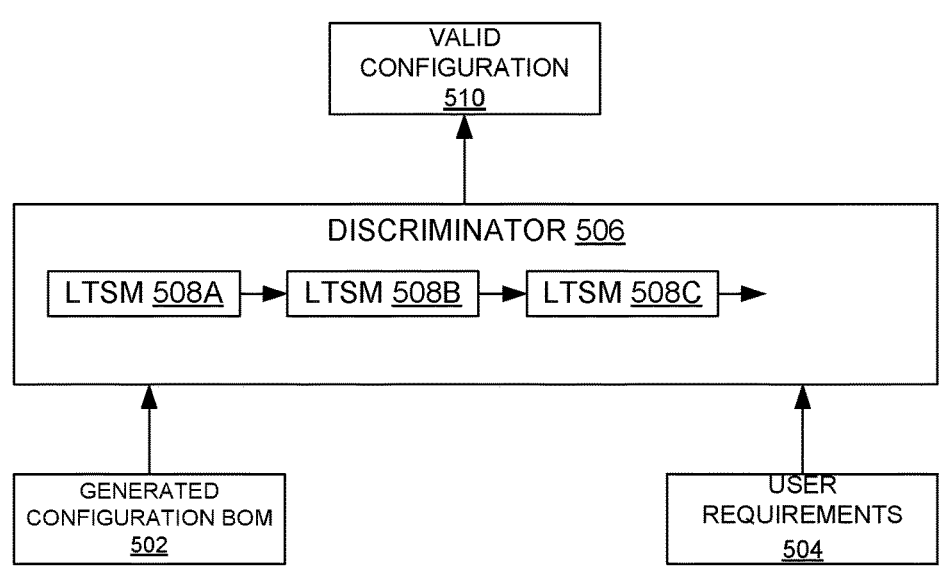
FIG. 5 illustrates another example system architecture that can facilitate ordering infrastructure using application terms, in accordance with an embodiment of this disclosure.

Infrastructure can include things such as storage, servers, networking, human-computer interaction (HCI), telecommunications, and edge devices. Infrastructure can be provided to a user in a variety of ways. The user can purchase the product, pay upfront, and be responsible for managing and configuring the product. The user can purchase the product, pay over a period of time, and be responsible for managing and configuring the product.

The user can pay per use, and a provider of the infrastructure can be responsible for managing the infrastructure. Here, the user can be charged based on a capacity of a particular service (e.g., file or block) needed, a performance tier, and a time duration. In this scenario, a user can need the provider of the service to estimate how much capacity and what performance tier meets the user's application/workload requirements.

A problem can be that there is not an automated tool to estimate the effort/cost (hardware needed, management effort, etc.). Rather, prior approaches can implement a manual process involving experts in forming a solution to a user's order. Being a manual process, these efforts/estimations can be based on the knowledge of a group of people whose knowledge is limited to whatever they have seen before and remember.

The present techniques can be implemented to automate this process to resolve these issues.

The present techniques can be implemented to provide a service that facilitates ordering infrastructure using application terms. This service can permit a user to specify needs in an application language (e.g., a particular type of database, online transactional processing (OLTP), 100 transactions per second, etc.). This service can consume the user requirements/needs expressed in application terms, and produce from that a plan that identifies a hardware bill of materials (HW BOM), connectivity needs, etc. The user and provider can use this plan to determine a set up (e.g., purchase, lease, pay-by-usage, etc.) that can fulfill these user needs that are expressed in application-level terms.

This service can be implemented by feeding user requirements, expressed as "user terms" (e.g., application-level requirements), to a trained machine learning (ML) system, which can produce a bill of materials, connectivity, etc., information that a provider can use to create an order and build the setup.

In prior approaches, a translation of user-level requirements (in application terms) to a BOM can be performed by a group of experts. A success of the translation can depend on these experts' skill and expertise. An approach according to the present techniques that is based on machine learning can take less time than a human to produce a solution, since humans can base their decisions on experience, while a ML model, trained with many actual field installs, can produce a more accurate decision because it can be based on current live data rather than past experience. For example, a database's performance can be improved such that fewer hardware resources are required to implement the database, but it can be that experts do not yet know by how much the hardware resources have changed, and the effects of this on a cloud computing platform.

A user can supply requirements per application. In an example, these requirements can be:

X database transactions per second with Y users for a first type of database

Z database operations per second for a second type of database

A number of users supported

A current workload

Power and/or cooling limitations for computer hardware installed on premises.

The present techniques can take user requirements and determine a required infrastructure to achieve the specified application transactions.

In prior approaches, in the field, an initial BOM can be created by an expert who receives user application-level requirements and produces the BOM from them. A cloud system can be built from the BOM and the user starts using it. While the user uses it, changes can be made to the BOM by the provider to support user requirements (e.g., add servers where the current compute capacity is insufficient, decrement storage where possible, etc.), and the computer cloud system can diverge from the original BOM as it is refined to better satisfy the user's original needs.

According to the present techniques, a neural network ML model can be trained with information collected from initial systems: a set of user requirements and an actual BOM that delivers these requirements (after an initial BOM was installed and changes were made to refine the installation). The trained neural network can be used to create new BOMs for new user requirements.

To train such a neural network model, current field data can be collected from existing telemetry and sales datasets of installations.

The present techniques can be implemented to simplify an ordering system. It can be that a user does not need to estimate/supply storage capacity, performance, networking estimates/requirements, and a server central processing unit (CPU) count. Rather, the user can use terms and performance numbers related to the user's content world.

The present techniques can also be implemented to facilitate a simple and more-accurate BOM production. There can be no need for experts to plan, review, and decide. A lower level of provider expertise can be sufficient during an order phase.

A neural network model according to the present techniques can improve over time.

In prior approaches, vender experts can need to be involved in an ordering/solutioning process. Some applications can have their own sizers that size a capacity and performance based on application/workloads, but those approaches can have problems. A problem can be that not all applications that users run in their data centers have a sizer. Even if existing sizers are leveraged, it can be that someone still needs to determine aggregate capacity, performance, CPU cores, etc., that are needed. Experts can still need to be involved to recommend correct infrastructure requirements.

The present techniques can be implemented with a generative adversarial network (GAN), which can comprise a combination of a discriminator and a generator that learns how to produce a legitimate-configuration BOM from user requirements.

The present techniques be implemented with a discriminator, which can comprise a long short-term memory (LTSM) neural network that takes requirements and configuration BOM, and returns a probability of legitimacy. The present techniques can also be implemented with a generator, which can comprise a LTSM that combines requirements with discriminator feedback to generate a configuration BOM.

Over time, as training data matures, a GAN model can improve.

In some examples, information about possible infrastructure can be determined by measuring installed infrastructure. For example, a storage array can be installed to gather per-application performance information and report this information to a GAN according to the present techniques. Telemetry data can be gathered from the field on an ongoing basis and provided to the discriminator, which can adjust a BOM appropriately on an on-going basis.

Take an example where a user can specify, "I need to handle a particular database type with 1,000 users, 500 transactions per second, and a transaction time of no more than 0.2 seconds." In some prior approaches, a person can translate this into a BOM based on his or her experience, and this BOM may, or may not, satisfy the user requirements. Then, a manual process of adjusting the BOM can be performed (adding/removing servers, adding/removing switches, etc.) to satisfy the user requirements.

In a scenario where there are already many infrastructure installations, a GAN can be trained on these existing field cases that represent a translation of user requirements to BOMs. When a new user comes with new requirements, a trained model can produce a BOM based on information learned from the field install base.

Put another way, instead of asking a user for information such as input/output (I/O) rates, capacity, etc., the user can specify requirements in business language.

The present techniques can be implemented to react to changes in infrastructure capabilities faster than prior approaches. For example, a database provider can change a performance characteristic of the database (e.g., it is now more reliant on host-cached data than disk access). In such a scenario, it can be that less (or cheaper) hardware can satisfy user needs. Under prior manual approaches, a person might not be aware of this change in the database performance characteristic. However, an implementation according to the present techniques that is training a GAN based on field data can observe the changes at existing sites and adapt to respond to this change. A GAN according to the present techniques can adapt to a lower BOM required while a person performing a manual approach according to prior techniques might not be aware of such a change.

Example Architectures

FIG. 1 illustrates an example system architecture that can facilitate ordering infrastructure using application terms, in accordance with an embodiment of this disclosure;

System architecture 100 comprises server 102, communications network 104, user computer 106, and infrastructure 110. In turn, server 102 comprises ordering infrastructure using application terms component 108.

Figure 11:
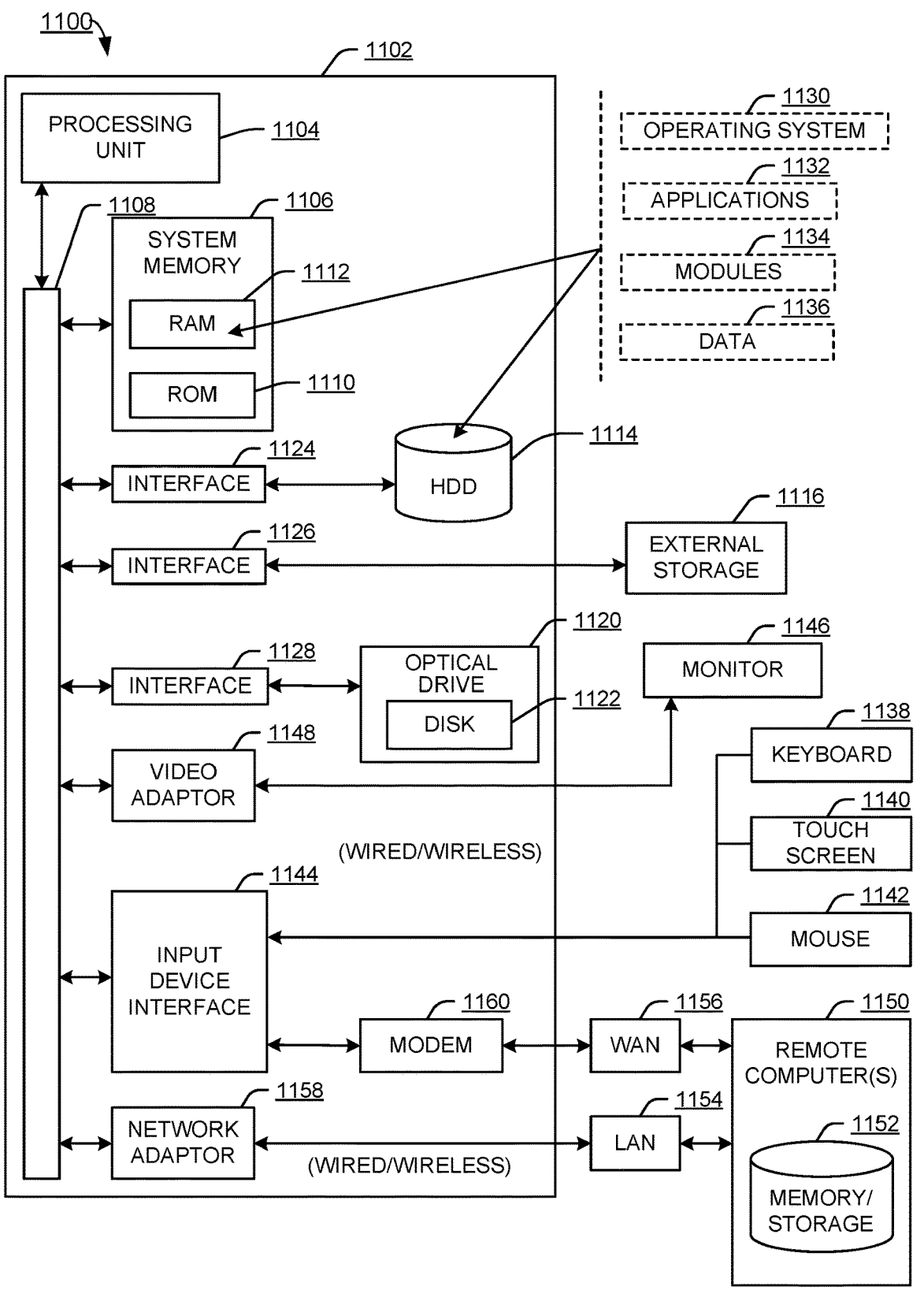
FIG. 11 illustrates an example block diagram of a computer operable to execute an embodiment of this disclosure.

Each of server 102, user computer 106, and/or infrastructure 110 can be implemented with part(s) of computing environment 1100 of FIG. 11. Communications network 104 can comprise a computer communications network, such as the Internet.

A user can use user computer 106 to express needs for computing infrastructure in application terms (e.g., a rate of database transactions, a number of concurrent users supported, a type of database, and/or a workload threshold). This information can be received by ordering infrastructure using application terms component 108, and from that, ordering infrastructure using application terms component 108 can determine infrastructure that meets those requirements (e.g., specific types of servers). This infrastructure can then be installed as infrastructure 110 for use by the user.

In some examples, ordering infrastructure using application terms component 108 can implement part(s) of the process flows of FIGS. 8-10 to implement ordering infrastructure using application terms.

It can be appreciated that system architecture 100 is one example system architecture for ordering infrastructure using application terms, and that there can be other system architectures that facilitate ordering infrastructure using application terms.

FIG. 2 illustrates another example system architecture that can facilitate ordering infrastructure using application terms, in accordance with an embodiment of this disclosure. In some examples, system architecture 200 can be used to implement part(s) of ordering infrastructure using application terms component 108 of FIG. 1.

System architecture 200 comprises input 202, machine learning (ML)/deep learning/artificial intelligence (AI) 204, and output 206.

Input 202 can comprise information about user requirements for computer infrastructure such as a particular application, a number of users, a workload supported, power limitations, and cooling limitations. Output 206 can comprise information about infrastructure that meets the requirements of input 202, such as storage/compute capacity, storage/compute performance, networking/switches, and server central processing unit (CPU) count.

In some examples, ML/deep learning/AI 204 can take input 202, and from input 202, produce output 206.

FIG. 3 illustrates another example system architecture that can facilitate ordering infrastructure using application terms, in accordance with an embodiment of this disclosure. In some examples, system architecture 300 can be used to implement part(s) of ordering infrastructure using application terms component 108 of FIG. 1.

System architecture 300 comprises user business requirements 302, GAN 304, and configuration BOM 310. In turn, GAN 304 comprises discriminator 306 and generator 308.

Mapping user requirements in application terms (e.g., user business requirements 302) to a BOM (e.g., configuration BOM 310) can be performed with a GAN (e.g., GAN 304) that is configured to learn a relationship between the user business requirements and the BOM. A GAM can generally comprise a generator (e.g., generator 308) and a discriminator (e.g., discriminator 306). A generator can be configured to produce a BOM. A discriminator can provide a probability of how accurate the BOM is based on the user requirements.

A GAN can generally comprise a form of machine learning where two independent neural networks compete to produce new instances that resemble the training data. Training a GAN generally comprise showing the network being trained what to do, and correcting it when it produces an incorrect result.

A GAN can be implemented with a recurrent neural network that comprises neurons and layers. Layers between the input and the output layer can be referred to as hidden layers. In some examples, each neuron in a hidden layer uses a sigmoid activation function to learn from examples. Within hidden layers, a RNN can learn hidden states. For example, when trained on sentences, hidden states can comprise noun, verb, adjective, simple structure, compound structure, etc.

A neuron can comprise a basic unit of functionality in a neural network. Each input to a neuron can be connected to a weight that ranges over [0, 1]. A sum of the weighted inputs can be fed into an activation function, which can describe a shape of a curve that changes an output that ranges over [0, 1]. A sigmoid activation function can be used.

The following is an example of neuron behavior. In this example, a neuron can be trained with weights to activate when the input is "CPU." That is, the neuron can characterize the input signal—is it "CPU" or not? In this example, the behavior of the input can change when it encounters "CAT." In the "CAT" example, since only one input matches, it can be that there is not enough of a sum to activate the output. A neural network can comprise thousands of neurons similar to this example neuron, whose weights can be customized by training with training data.

A neural network can be trained in batches, where an input is fully connected to a first layer of neurons of the neural network. It can be that there is one neuron in the first layer of neurons for each character in the input buffer.

For example, a neural network can accept a page of a book at a time. Each page can be a batch, and each book can be an epoch. In the present techniques, batch size can be matched to a maximum configuration length.

Training loss can be determined by comparing input and output, and determining a loss (error). A loss can then be used to generate backpropagation to the neural network.

Gradient descent can be used across the network of neurons to update input weights and gradually nudge the network toward minimizing loss. A network can minimize the loss over time by repeatedly training over the training data. One epoch of training can comprise a single pass over the training data; that is, one cycle of viewing the input data and backpropagation.

Training can be complete when a threshold of loss is crossed, e.g., 10%.

In the present techniques, a long short-term memory (LTSM) neural network can be implemented, which can comprise a RNN architecture that protects against a vanishing gradient problem. A vanishing gradient problem can exist where a RNN forgets things that it has not recently encountered. For example, when trained on source code, a LTSM can be configured to remember that an open parenthesis needs to be followed by a close parenthesis independent of intervening data.

In some examples, a traditional RNN would only remember examples of how open and closed parentheses are used. A LTSM can solve this with added logic gates that help with backpropagation and memory. This can facilitate a neural network learning order dependence and sequence.

The following is a LTSM example. Cell state (n−1) can comprise an aggregation of all previous states. Hidden state (n−1) can comprise a characterization of the previous input data. Input (n) can comprise a next piece of new information. A remember gate can comprise an activation function with weights that determine when it is time to learn. For example, where the goal is to recognize sentences, there can be a cell for "simple structure" and it can prevent the cell from activating (learning) in a case of a compound or complex sentence.

An input gate can pass an input to cell state (n+1) and conditionally pass to an output gate based on a remember gate activation. An output gate can produce a characterization for a next layer. Cell state (n+1) can indicate the next future state. Hidden state (n+1) can indicate a future characterization for the next layer.

FIG. 4 illustrates another example system architecture 400 that can facilitate ordering infrastructure using application terms, in accordance with an embodiment of this disclosure. In some examples, system architecture 400 can be used to implement part(s) of ordering infrastructure using application terms component 108 of FIG. 1.

System architecture 400 comprises user requirements 402a, user requirements 402b, generator 404, generated configuration BOM 408, discriminator 410, valid configuration 412 (which can indicate whether a particular BOM is valid), and backpropagation 414. In turn, generator 404 comprises LTSM 406a, LTSM 406b, and LTSM 406c; and discriminator 410 comprises LTSM 406d, LTSM 406e, and LTSM 406f.

With the present techniques, a GAN architecture (e.g., system architecture 400) can comprise a discriminator (e.g., discriminator 410) that can determine the legitimacy of a configuration when given a BOM (e.g., generated configuration BOM 408) and corresponding user requirements (e.g., user requirements 402b). The GAN architecture can train a generator (e.g., generator 404) over multiple epochs, incorporating feedback from the discriminator.

FIG. 5 illustrates another example system architecture 500 that can facilitate ordering infrastructure using application terms, in accordance with an embodiment of this disclosure. In some examples, system architecture 500 can be used to implement part(s) of ordering infrastructure using application terms component 108 of FIG. 1.

System architecture 500 comprises BOM 502, user requirements 504, discriminator 506, LSTM 508a, LTSM 508b, LTSM 508c, and valid configuration 510.

Training a discriminator (e.g., discriminator 506) can be implemented as follows. The discriminator can be trained using existing user requirements (e.g., user requirements 504) and BOM (e.g., BOM 502). The discriminator can first determine if a configuration is valid (e.g., as indicated by an output for valid configuration 510), and then whether it meets the requirements.

For example, sentiment analysis can be performed on "happy happy joy" to determine whether it is a positive sentence. It can be determined that this is not a positive sentence because, while it contains positive terms, it is not grammatically correct.

Accuracy of the discriminator can be increased by leveraging existing configuration BOMs even if they lack associated requirements. Doing so can accelerate a learning in the GAN because it will more quickly stop producing bad configurations.

FIG. 6 illustrates another example system architecture that can facilitate ordering infrastructure using application terms, in accordance with an embodiment of this disclosure. In some examples, system architecture 600 can be used to implement part(s) of ordering infrastructure using application terms component 108 of FIG. 1.

System architecture 600 comprises independent backpropagation 602, user requirements 604, generator 606, LTSM 608a, LTSM 608b, LTSM 608c, and generated configuration BOM 610.

A generator (e.g., generator 606) can map requirements into a BOM (e.g., generated configuration BOM 610). The generator can learn associations between user requirements and a BOM by incorporating feedback from a discriminator (e.g., via independent backpropagation 602).

In some examples, back propagation can introduce information not found in training data (e.g., the storage is now twice as fast). In some examples, an administrator can insert information into the backpropagation to accelerate a training process.

FIG. 7 illustrates another example system architecture that can facilitate ordering infrastructure using application terms, in accordance with an embodiment of this disclosure. In some examples, system architecture 700 can be used to implement part(s) of ordering infrastructure using application terms component 108 of FIG. 1.

System architecture 700 comprises backpropagation 702, user requirements 704a, user requirements 704b, generator 706, generated configuration BOM 710, discriminator 712, and valid configuration 714. In turn, generator 706 comprises LTSM 708a, LTSM 708b, and LTSM 708c; and discriminator 712 comprises LTSM 708d, LTSM 708e, and LTSM 708f.

Training can be performed over many epochs to improve network behavior. A discriminator (e.g., discriminator 712) can become more skillful in detecting bad configurations while a generator (e.g., generator 706) can simultaneously correct for errors.

Backpropagation (e.g., backpropagation 702) can be used to leverage an output of the discriminator. A role of backpropagation can be to make incremental changes to a previously-generated BOM. This can be done through randomly changing weights in LTSM cells to introduce perturbations in the network. This can be continuously updated with new training examples as they become available.

Example Process Flows

FIG. 8 illustrates an example process flow 800 that can facilitate ordering infrastructure using application terms, in accordance with an embodiment of this disclosure. In some examples, one or more embodiments of process flow 800 can be implemented by ordering infrastructure using application terms component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, and/or process flow 1000 of FIG. 10.

Process flow 800 begins with 802, and moves to operation 804.

Operation 804 depicts training a generator neural network to produce a trained generator neural network of a generative adversarial network, wherein the trained generator neural network is configured to output a bill of materials in response to receiving functional requirements for a computer system. This trained generator can be similar to generator 404 of FIG. 4, which receives user requirements 402a as input and outputs generated configuration BOM 408.

In some examples, the generator neural network is trained with training data that comprises the functional requirements for the computer system, and independent back propagation data that is received from the trained discriminator neural network. That is, training a generator neural network can be performed with data such as user requirements 402a and backpropagation 414 of FIG. 4.

After operation 804, process flow 800 moves to operation 806.

Operation 806 depicts training a discriminator neural network to produce a trained discriminator neural network of the generative adversarial network, wherein the trained discriminator neural network is configured to output whether the bill of materials received from the trained generator neural network satisfies the functional requirements for the computer system. This trained discriminator can be similar to discriminator 410 of FIG. 4, which receives generated configuration BOM 408 and user requirements 402b, and outputs valid configuration 412.

In some examples, the discriminator neural network is trained according to a supervised learning technique. That is, labeled training data (e.g., user requirements labeled with corresponding infrastructure) can be used to train the discriminator neural network.

In some examples, the discriminator neural network is trained with training data that comprises the output bill of materials. That is, a discriminator neural network can be trained on BOMs as input (e.g., generated configuration BOM 408 of FIG. 4). In some examples, the discriminator neural network is trained according to an unsupervised learning technique. That is, the discriminator neural network can be trained on input data (e.g., BOMs) that is not labeled.

In some examples, the discriminator neural network is trained with labeled training data that comprises respective bills of materials that include the output bill of materials, and respective functional requirements for computer systems that include the functional requirements. That is, the discriminator neural network can be trained with data that is similar to generated configuration BOM 408 and user requirements 402b of FIG. 4.

In some examples, the discriminator neural network is trained according to a supervised learning technique. That is, the discriminator neural network can be trained with labeled training data, such as BOMs and labels that indicate whether respective BOMs are valid.

In some examples, the discriminator neural network is trained with a first group of training data that comprises first bills of materials that omit corresponding first functional requirements, and with a second group of training data that comprises respective second bills of materials and respective functional requirements for computer systems. That is, the discriminator neural network can be trained on different types of data, including just BOMs, and also BOMs that have corresponding functional requirements for computer systems.

That is, in some examples, a discriminator can be trained on legitimate (or valid) configurations, even where those legitimate configurations are lacking associated customer requirements. That is, the discriminator can be trained with examples of invalid server, network, and storage combinations. Training data can be labeled according to two dimensions—one that is a Boolean true/false label that indicates whether a configuration is valid, and another that is customer requirements.

Put another way, training data can be used that is labeled true/false as to whether it represents a legitimate configuration, while the corresponding customer requirements ae unknown. This type of training data can be used to augment available training data to train a discriminator more quickly.

After operation 806, process flow 800 moves to operation 808.

Operation 808 depicts producing an output bill of materials from the generative adversarial network based on the functional requirements. This generative adversarial network can comprise generator 404 and discriminator 410 of FIG. 4. This generative adversarial network, using the example of FIG. 4, can output generated configuration BOM 408.

After operation 808, process flow 800 moves to operation 810.

Operation 810 depicts storing the output bill of materials in the system. This can be stored in a memory, and then used as the basis for creating infrastructure, such as infrastructure 110 of FIG. 1.

After operation 808, process flow 800 moves to 812, where process flow 800 ends.

FIG. 9 illustrates an example process flow 900 that can facilitate ordering infrastructure using application terms, in accordance with an embodiment of this disclosure. In some examples, one or more embodiments of process flow 900 can be implemented by ordering infrastructure using application terms component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, and/or process flow 1000 of FIG. 10.

Process flow 900 begins with 902, and moves to operation 904.

Operation 904 depicts training a generator neural network to produce a trained generator neural network, wherein the trained generator neural network is configured to output a bill of materials in response to receiving functional requirements for a computer system. In some examples, operation 904 can be implemented in a similar manner as operation 804 of FIG. 8.

After operation 904, process flow 900 moves to operation 906.

Operation 906 depicts training a discriminator neural network to produce a trained discriminator neural network, wherein the trained discriminator neural network is configured to output whether the bill of materials received from the trained generator neural network satisfies the functional requirements for the computer system. In some examples, operation 906 can be implemented in a similar manner as operation 806 of FIG. 8.

In some examples, the trained discriminator neural network is configured to determine whether the resulting bill of materials satisfies a validity criterion. That is, the trained discriminator neural network can output valid configuration 412, which can indicate whether a particular input BOM represents a valid configuration.

In some examples, the trained discriminator neural network is configured to determine whether the resulting bill of materials satisfies the validity criterion before outputting whether the resulting bill of materials satisfies the functional requirements for the computer system. That is, the trained discriminator neural network can first determine whether a BOM is valid before determining whether the BOM satisfies user requirements (e.g., user requirements 402b of FIG. 4).

In some examples, the generator neural network is trained over epochs, wherein a first epoch of the epochs comprises a first pass over training data, and wherein a second epoch of the epochs comprises a second pass over the training data.

In some examples, the generator neural network is trained with batches, and wherein a batch of the batches has a size that corresponds to a maximum length of the resulting bill of materials.

After operation 906, process flow 900 moves to operation 908.

Operation 908 depicts producing a resulting bill of materials from the trained generator neural network and the trained discriminator neural network based on a first identifier of functional requirements. In some examples, operation 908 can be implemented in a similar manner as operation 808 of FIG. 8.

After operation 908, process flow 900 moves to 910, where process flow 900 ends.

FIG. 10 illustrates an example process flow 1000 that can facilitate ordering infrastructure using application terms. In some examples, one or more embodiments of process flow 1000 can be implemented by ordering infrastructure using application terms component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8, and/or process flow 900 of FIG. 9.

Process flow 1000 begins with 1002, and moves to operation 1004.

Operation 1004 depicts training a first neural network to produce a trained first neural network, wherein the trained first neural network is configured to output a bill of materials in response to receiving functional requirements for a computer system. In some examples, operation 1004 can be implemented in a similar manner as operation 804 of FIG. 8.

In some examples, the functional requirements for the computer system comprise a rate of database transactions, a number of concurrent users supported, a type of database, a workload threshold, or an infrastructure requirements for a computing device.

In some examples, the generated bill of materials comprises a storage capacity, a compute capacity, a storage performance, a compute performance, a networking configuration, or a number of computer processors.

After operation 1004, process flow 1000 moves to operation 1006.

Operation 1006 depicts training a second neural network to produce a trained second neural network, wherein the trained second neural network is configured to output whether the bill of materials received from the trained first neural network satisfies the functional requirements for the computer system. In some examples, operation 1006 can be implemented in a similar manner as operation 806 of FIG. 8.

In some examples, the trained second neural network comprises a trained discriminator neural network, and the trained first neural network comprises a trained generator neural network.

In some examples, the trained second neural network comprises a long-short-term memory neural network. In some examples, the trained first neural network comprises a long-short-term memory neural network.

After operation 1006, process flow 1000 moves to operation 1008.

Operation 1008 depicts storing a generated bill of materials, which was generated from the trained first neural network and the trained second neural network based on the functional requirements. In some examples, operation 1008 can be implemented in a similar manner as operation 808 of FIG. 8.

After operation 1008, process flow 1000 moves to 1010, where process flow 1000 end.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of server 102, communications network 104, user computer 106 and/or infrastructure 110 of FIG. 1.

In some examples, computing environment 1100 can implement one or more embodiments of the process flows of FIGS. 8-10 to facilitate ordering infrastructure using application terms.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory coupled to the at least one processor, comprising instructions that cause the processor to perform operations comprising:

training a generator neural network to produce a trained generator neural network of a generative adversarial network, wherein the trained generator neural network is configured to output a bill of materials in response to receiving functional requirements for a computer system;

training a discriminator neural network to produce a trained discriminator neural network of the generative adversarial network, wherein the trained discriminator neural network is configured to output whether the bill of materials received from the trained generator neural network satisfies the functional requirements for the computer system;

producing an output bill of materials from the generative adversarial network based on the functional requirements, wherein the producing comprises:

the trained generator neural network of the generative adversarial network producing the output bill of materials, and after the trained generator neural network of the generative adversarial network produces the output bill of materials, the trained discriminator neural network of the generative adversarial network validating the output bill of materials relative to the functional requirements; and storing the output bill of materials in the system.

2. The system of claim 1, wherein the generator neural network is trained with training data that comprises the functional requirements for the computer system, and independent back propagation data that is received from the trained discriminator neural network.

3. The system of claim 2, wherein the discriminator neural network is trained according to a supervised learning technique.

4. The system of claim 1, wherein the discriminator neural network is trained with training data that comprises the output bill of materials.

5. The system of claim 4, wherein the discriminator neural network is trained according to an unsupervised learning technique.

6. The system of claim 5, wherein the discriminator neural network is trained with labeled training data that comprises respective bills of materials that include the output bill of materials, and respective functional requirements for computer systems that include the functional requirements.

7. The system of claim 6, wherein the discriminator neural network is trained according to a supervised learning technique.

8. The system of claim 1, wherein the discriminator neural network is trained with a first group of training data that comprises first bills of materials that omit corresponding first functional requirements, and with a second group of training data that comprises respective second bills of materials and respective functional requirements for computer systems.

9. The system of claim 8, wherein the first group of training data is labeled with an indication of whether respective first bills of materials of the first bills of materials are valid, and wherein the second group of training data is labeled with an indication of whether respective second bills of materials of the second bills of materials are valid.

10. A method, comprising:

training, by a system comprising at least one processor, a generator neural network to produce a trained generator neural network, wherein the trained generator neural network is configured to output a bill of materials in response to receiving functional requirements for a computer system;

training, by the system, a discriminator neural network to produce a trained discriminator neural network, wherein the trained discriminator neural network is configured to output whether the bill of materials received from the trained generator neural network satisfies the functional requirements for the computer system; and producing a resulting bill of materials from the trained generator neural network and the trained discriminator neural network based on a first identifier of functional requirements, wherein the producing comprises:

the trained generator neural network of the generative adversarial network producing the output bill of materials, and after the trained generator neural network of the generative adversarial network produces the output bill of materials, the trained discriminator neural network of the generative adversarial network validating the output bill of materials relative to the functional requirements.

11. The method of claim 10, wherein the trained discriminator neural network is configured to determine whether the resulting bill of materials satisfies a validity criterion.

12. The method of claim 11, wherein the trained discriminator neural network is configured to determine whether the resulting bill of materials satisfies the validity criterion before outputting whether the resulting bill of materials satisfies the functional requirements for the computer system.

13. The method of claim 10, wherein the generator neural network is trained over epochs, wherein a first epoch of the epochs comprises a first pass over training data, and wherein a second epoch of the epochs comprises a second pass over the training data.

14. The method of claim 10, wherein the generator neural network is trained with batches, and wherein a batch of the batches has a size that corresponds to a maximum length of the resulting bill of materials.

15. A non-transitory computer-readable medium comprising instructions that, in response to execution, cause a system comprising at least one processor to perform operations, comprising:

training a first neural network to produce a trained first neural network, wherein the trained first neural network is configured to output a bill of materials in response to receiving functional requirements for a computer system;

training a second neural network to produce a trained second neural network, wherein the trained second neural network is configured to output whether the bill of materials received from the trained first neural network satisfies the functional requirements for the computer system; and storing a generated bill of materials, wherein the trained first neural network produces the generated bill of materials based on the functional requirements, and wherein, after the trained first neural network produces the generated bill of materials, the trained second neural network validates the generated bill of materials against the functional requirements.

16. The non-transitory computer-readable medium of claim 15, wherein the trained second neural network comprises a trained discriminator neural network, and wherein the trained first neural network comprises a trained generator neural network.

17. The non-transitory computer-readable medium of claim 15, wherein the functional requirements for the computer system comprise a rate of database transactions, a number of concurrent users supported, a type of database, a workload threshold, or an infrastructure requirements for a computing device.

18. The non-transitory computer-readable medium of claim 15, wherein the generated bill of materials comprises a storage capacity, a compute capacity, a storage performance, a compute performance, a networking configuration, or a number of computer processors.

19. The non-transitory computer-readable medium of claim 15, wherein the trained second neural network comprises a long-short-term memory neural network.

20. The non-transitory computer-readable medium of claim 15, wherein the trained first neural network comprises a long-short-term memory neural network.

\* \* \* \* \*